US009178909B2

(12) United States Patent
Chan et al.

(10) Patent No.: US 9,178,909 B2
(45) Date of Patent: Nov. 3, 2015

(54) GRAPHICAL REPRESENTATION OF A PORT SECURITY STATE

(75) Inventors: Allan Chan, Roseville, CA (US);
Neeshant D. Desai, Roseville, CA (US);
Adrian Cowham, Roseville, CA (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 1931 days.

(21) Appl. No.: 11/580,459

(22) Filed: Oct. 13, 2006

(65) Prior Publication Data
US 2008/0092069 A1    Apr. 17, 2008

(51) Int. Cl.
G06F 15/173    (2006.01)
H04L 29/06    (2006.01)
G06F 3/0481    (2013.01)
G06F 15/177    (2006.01)
G06F 3/00    (2006.01)
H04L 12/26    (2006.01)

(52) U.S. Cl.
CPC ............ *H04L 63/20* (2013.01); *G06F 3/04817* (2013.01); *G06F 15/173* (2013.01); *G06F 3/00* (2013.01); *G06F 15/177* (2013.01); *H04L 43/0817* (2013.01)

(58) Field of Classification Search
USPC ................. 726/22, 11; 715/763; 709/225
See application file for complete search history.

(56) References Cited

U.S. PATENT DOCUMENTS

| 6,484,261 | B1 * | 11/2002 | Wiegel | 726/11 |
|---|---|---|---|---|
| 7,134,090 | B2 * | 11/2006 | Kodosky et al. | 715/769 |
| 7,342,891 | B2 * | 3/2008 | Chen et al. | 370/241 |
| 7,478,333 | B2 * | 1/2009 | Shah et al. | 715/753 |
| 2004/0181690 | A1 * | 9/2004 | Rothermel et al. | 713/201 |
| 2005/0027703 | A1 * | 2/2005 | Ho et al. | 707/4 |
| 2005/0229249 | A1 * | 10/2005 | Piwonka et al. | 726/22 |

OTHER PUBLICATIONS

Ball et al., Home-Centric Visualization of Network Traffic for Security Administration, Oct. 29, 2004, ACM, 1-58113-9748-8/04/0010.*

* cited by examiner

*Primary Examiner* — Jeffrey Pwu
*Assistant Examiner* — Samuel Ambaye
(74) *Attorney, Agent, or Firm* — Mannava & Kang, P.C.

(57) ABSTRACT

Information associated with a port security state of a network device is received. The received information is converted into an icon that corresponds to the port security state of the network device. The icon is displayed to a user.

17 Claims, 5 Drawing Sheets

Port Settings Table 211

| Port Name | Authentication Status | Security Status | QoS | Rate Limit % |
|---|---|---|---|---|
| A1 | ■ | ⊠⌒ | N/A | N/A |
| A2 | □ | ⊠ | ■ | ◐ |
| B1 | ▨ | ⊠ | ▯ | ◐ |

Header 213

212

[Refresh] [Polling] [Close]

Port Setting Indicator 311

313 → Authentication Status
   ▨ Open, authenticated
312 → ▨ Authenticating
   ■ Insecured port, security issue
   □ Closed, no login
   ■ Failed authentication, closed 313 → Security Status
   ⊠ Secured port
312 → ⊠⌒ Insecure port 313 → Quality of Service
   ▯ Low
312 → ■ Normal 313 → Rate Limit %
312 → ◐ 50%

Figure 3

GRAPHICAL REPRESENTATION OF A PORT SECURITY STATE

TECHNICAL FIELD

The present invention relates broadly to computer networks. More specifically, embodiments of the present invention relate to port security states.

BACKGROUND

The security of computer networks is an increasingly important issue. With the growth of the Internet, a growing number of people rely on computer networks to transfer and store increasingly valuable information. As more people began using networks in greater frequency, networks have grown tremendously. Furthermore, with the growth in the size of networks and the importance of information available on the networks, there is a corresponding need for greater security monitoring. Thus in network environments, it is often necessary or desirable to collect and display a variety of port security states associated with one or more network device(s). Desirable port security states to collect may include information associated with port authentication status, port security status, port access indicator status, port access MAC-based status, port access web-based status, port priorities, inbound rate limit maximum percentage, and quality of service. Conventionally, a user has to input long command lines for each type of port security information (e.g., port authentication status, port access indicator status, and port access web-based status) before the requested information is returned in a string format or in a non-descriptive presentation of true/false or yes/no. However, not only do port security state information in these traditional formats generally require intensive reading by the users to formulate the results, these results may also be displayed in non-standardized formats depending on the network device firmware revision. To exacerbate the problem, often conventional displays of port security information do not provide enough details in an easy to understand format to make educated decisions in regards to port security settings.

SUMMARY

Information associated with a port security state of a network device is received. The received information is converted into an icon that corresponds to the port security state of the network device. The icon is displayed to a user.

BRIEF DESCRIPTION OF THE DRAWINGS

FIG. 2 illustrates an exemplary interface, upon which embodiments may be implemented.

FIG. 3 illustrates an exemplary legend upon which embodiments may be implemented.

DETAILED DESCRIPTION

Figure 1A:
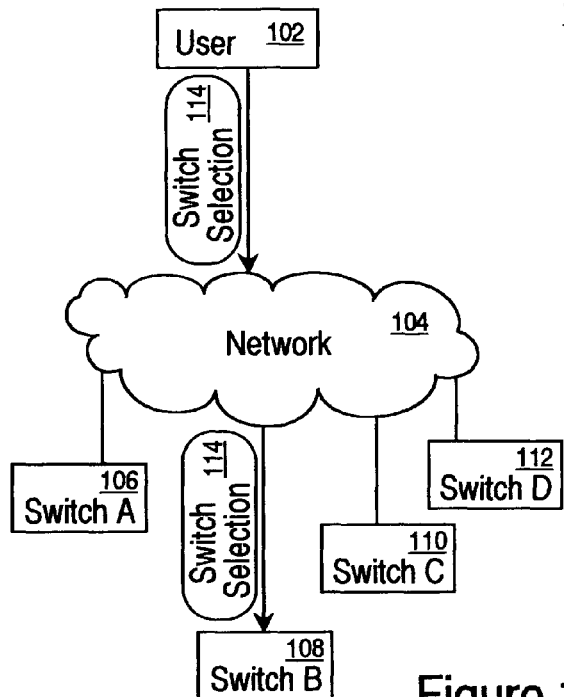
FIG. 1A illustrates a block diagram of an exemplary system upon which embodiments may be implemented.

Graphical displays of port security states are described. Reference will now be made in detail to embodiments, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

In overview, embodiments pertain to graphical displays of port security states of designated network devices (e.g., switches). A port security state is the general security condition of a port of a designated network device, including, but not limited to, the security status and the authentication status of the port. In addition, the graphical display may also communicate to a user whether the port is open or closed. If a display shows an open port, then it means that someone is logged into the port of the network device. If a display shows a closed port, then it means that no one is logged in to the port of the network device.

In some instances, the present embodiment also includes a graphic interface that displays one or more port security state(s) of one or more chosen network device(s) both visually and with concise text without the input of command lines from the user. More specifically, the present embodiment allows the user to select the network device(s) from which information pertaining to port security state of the chosen network device(s) will be converted into one or more icon(s) to be displayed to the user. Furthermore, the present embodiment may allow the user to both easily select immediate updates on the port security state and to configure the time interval for updates on the port security state. This means instead of having to input command lines and interpret tedious amounts of data, the user can be informed of the real-time critical status of port security state by selecting the chosen network device(s).

In the present embodiment, the security status of the port security state refers to whether the selected port of the selected device is a secured port, or an insecure port, while authentication status refers to the status of the security measure in which verification of the user's eligibility to access the network and/or port is required. To illustrate, in some instances, a matching username and a matching password is required for authentication. For example, in such instances, if a user is logged in with a verified user name and a verified password, then the graphical display of the port security state of a designated network device would communicate an authenticated status. The distinction between a secure and an insecure port is also important because if a port is not secured, a user can gain access to the port and consequently all the facility of the associated network device without verification of the user's eligibility (e.g., matching user name and password). Thus, the network administrator has to be careful not to leave the port insecure.

Figure 1B:
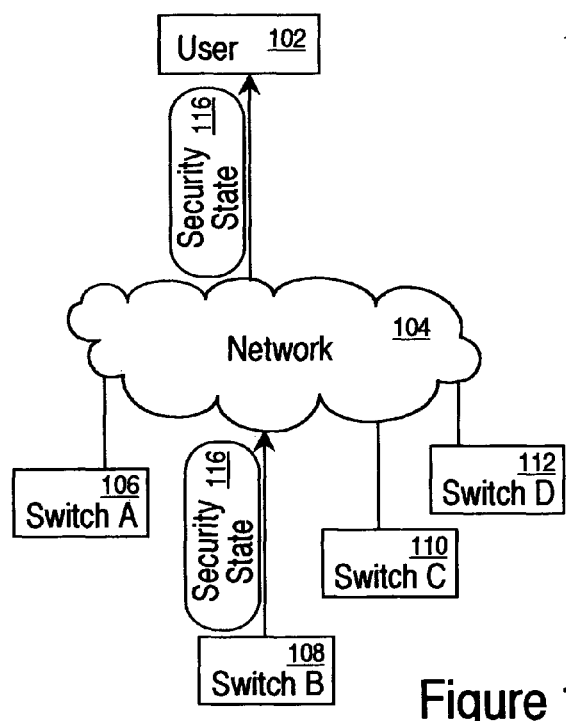
FIG. 1B illustrates a block diagram of an exemplary system upon which embodiments may be implemented.

FIGS. 1A and 1B are block diagrams of an exemplary system 100 upon which embodiments may be implemented. The system 100 shows the components of an exemplary graphical port security state display in accordance with the present embodiment. As depicted in FIGS. 1A and 1B, the exemplary graphical port security state 100 includes a user 102, a plurality of switches A, B, C, and D (e.g., 106, 108, 110, and 112 respectively), all coupled to one another via the network 104. Although system 100 is shown and described as having certain numbers and types of elements, the present embodiment is not so limited; that is, system 100 may include elements other than those shown, and may include more than one of the elements that are shown.

As depicted by system 100 of FIGS. 1A and 1B, network 104 is a data communications system that interconnects devices. The network 104 can be implemented in a wide variety of ways. For example, network 104 can be implemented as, but is not limited to, a local area network (LAN), and metropolitan area network (MAN), a wide area network (WAN), a storage area network, and/or the Internet. In one embodiment, network 104 is a wireless network.

The user 102 the system 100, depicted by FIGS. 1A and 1B, can be an individual user device, a network manager, an application program, an enterprise, or a service provider. The user 102 can issue a request for information (also referred to as data) associated with the port security state of a network device, or a group of network devices connected to network 104 (e.g., switches 106, 108, 110, and 112). The user 102 can also select or designate the network device(s) from which associated port security state information will be received. Additionally, the user 102 may also select to update the associated port security state information to be converted into one or more icon(s) to be displayed to user 102.

In reference to FIGS. 1A and 1B, the present embodiment is described in the context of an example in which all the network devices of the exemplary network are switches. The present embodiment is further described in the context of an example in which the user 102 selects switch B 108 as the designated network device from which port security state information will be received. However, this example can be readily extended to other situations and embodiments. For example, the user 102 may select switch D 112 as the designated network device from which port security state information will be received. In another example, the user 102 may select all the network devices depicted in FIGS. 1A and 1B (e.g., switches A, B, C and D, or switches 106, 108, 110, and 112 respectively). The user 102 may also select other network devices not depicted in FIGS. 1A and 1B from which port security state information will be received.

In reference now to FIG. 1A, in operation, the user 102 sends a switch selection signal 114 to switch B 108 via the network 104. The network device switch selection signal 114 is sent to switch B because switch selection signal 114 is a signal selecting switch B 108 as the designated network device. In the present embodiment, the switch selection signal 114 is sent by the user 102 with a selection of the mouse instead of an input of command lines.

Referring now to FIG. 1B, also in operation, switch B 108 returns to the user 102 the security state information signal 116 via the network 104. The security state information signal 116 is a signal containing data associated with the port security states of switch B 108. The data of security state information signal 116 may include textual information such as, but not limited to, port access indicator status, port access MAC-based status, port access web-based status, port priorities, port access authenticator status, inbound rate limit maximum percentage, and quality of service. In this example, once the port security information signal 116 is received by the user 102, the information is converted by the present embodiment into an interface containing multiple icons that convey at least a subset of the textual information contained in the information.

FIG. 2 is a block diagram of an exemplary interface 211 upon which embodiments may be implemented. In this example, exemplary interface 211 is referred to as the port settings table 211. As depicted in FIG. 2, the exemplary port settings table 211 includes a set of icons 212, a set of headers 213, a refresh button 214, a polling button 215, and a close button 216. Although exemplary interface 211 is shown and described as having certain numbers and types of elements, the present embodiment is not so limited; that is exemplary interface 211 may include elements other than those shown, and may include more than one of the elements that are shown. In addition, in another embodiment, exemplary interface 211 does not include all of the numbers and types of elements shown in FIG. 2.

In reference to the present embodiment depicted by FIG. 2, the header 213 divides the table into five categories (e.g., port name, authentication status, security status, quality of service, and maximum rate limit percentage). The five categories each contain information drawn from the data received from the selected network device (e.g., security state signal 116 from switch B 108 of FIGS. 1A and 1B). Referring back now to FIG. 2, under the column with the header titled "Port Name", the names of the three ports of a selected network device is given (e.g., A1, A2, and B1). In the present embodiment, each of these three ports have a corresponding authentication status, security status, quality of service, and rate limit percentage as indicated by header 213.

Still in reference to FIG. 2, in present embodiment, the set of icons 212 are graphical representations of port security states of a network device displayed to a user. For example, in the present embodiment, under the column with the header titled "Authentication Status" are colors indicating the authentication status of the corresponding ports. Further, under the column with the header titled "Security Status" a shape is used to represent the security status of the corresponding port. In present embodiment, the icons representing the security status are in the shape of either an open lock or a close lock. In addition, in the present embodiment, under the header titled "QoS" other symbols (e.g., cups containing various amount of liquids) are used to represent the quality of service of the corresponding ports. Finally, in the present embodiment, under the header titled "Rate Limit %" yet another symbol (e.g., a half pie) is used to represent the rate limit bandwidth of the corresponding ports.

FIG. 3 is a block diagram of an exemplary legend upon which embodiments may be implemented. In present embodiment, the exemplary legend is referred to as the Port Setting Indicator 311. In the present embodiment, Port Settings Indicator 311 is illustrated to a user for clarifying and/or explaining the icons displayed the user. In one embodiment, a legend (e.g., Port Setting Indicator 311) is displayed to a user simultaneously along with a graphical display of port security states of designated network devices (e.g., Port Settings Table 211 of FIG. 2). In another embodiment, a legend is displayed to a user either before or after a graphical display of a port security state of a designated network device. A legend may contain illustration of one type of icon, or a legend may contain illustrations of various types and/or numbers of icons.

Referring back now to FIG. 3, as depicted in FIG. 3, the exemplary port settings indicator 311 includes a set of icons 312 and a set of headers 313. In the present embodiment, the set of headers 313 categorizes the icons by authentication status, security status, quality of service, and rate limit percentage. The set of icons 312 illustrates and/or clarifies the meaning of the icons as they are used in the graphical display of the port security state (e.g., Port Settings Table 211 of FIG. 2). Referring back now to FIG. 3, in the present embodiment, under the header categorizing authentication status, each of the various colored blocks indicates an authentication status. For example, in present embodiment, a green color block indicates that the port is open and authenticated, a yellow color block indicates that the port is authenticating, a white block indicates the port is closed and has no login user, a black color block indicates the port has a failed authentication and is closed, and a red color block indicates the port is insecure and poses a security issue.

Still referring to FIG. 3, in the present embodiment, under the header categorizing security status, icons in the form of opened and unopened locks indicate security statuses. In this example, an unopened/closed lock indicates a secured port, while an open lock indicates an insecure port. In another embodiment, the icons indicating security status of a port take form in a shape that is not a lock. Security statuses may also be represented by different colored icons. In the present embodiment, under the header categorizing quality of service, cups containing various amounts of liquids are used to represent the quality of service of the corresponding ports. In this example, a half full cup indicates a low quality of service, while a full cup indicates a normal quality of service. Under the header titled "Rate Limit %" a half pie is used to represent the 50% rate limit bandwidth of a corresponding port. Though specific icons are disclosed in FIG. 3, such specific icons are exemplary. That is, icons may be in different colors, different shapes, and/or different symbols from those depicted in FIG. 3.

Figure 4A:
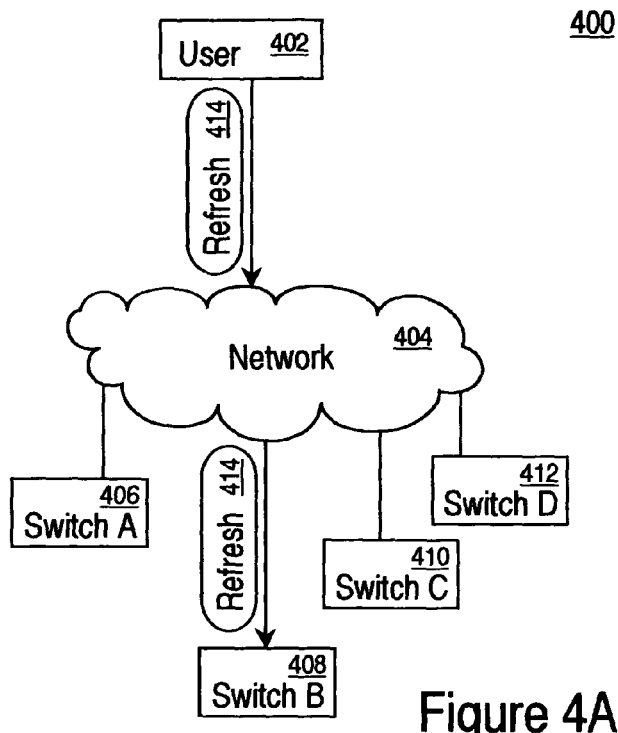
FIG. 4A illustrates a block diagram of an exemplary system upon which embodiments may be implemented.
Figure 4B:
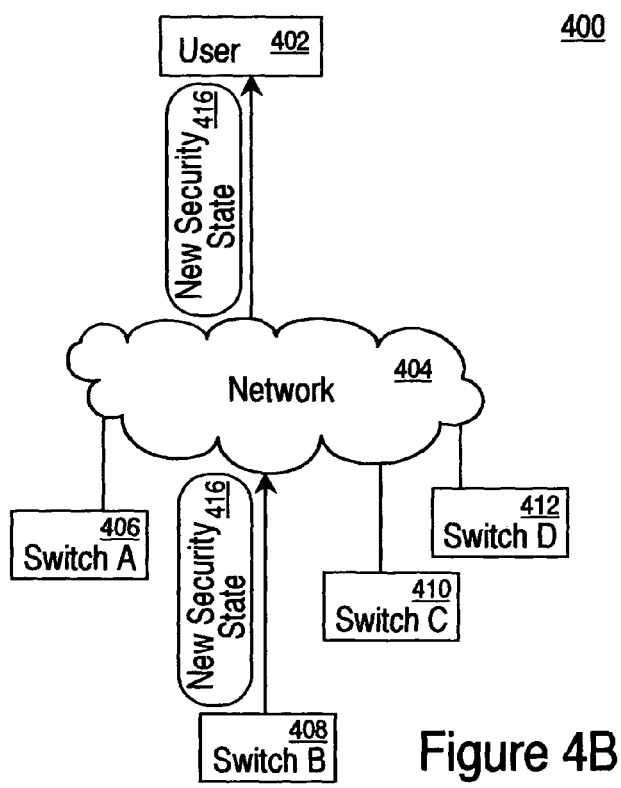
FIG. 4B illustrates a block diagram of an exemplary system upon which embodiments may be implemented.

Referring now to FIGS. 4A and 4B, FIGS. 4A and 4B are block diagrams of an exemplary system 400 upon which embodiments may be implemented. The system 400 shows the components of an exemplary graphical port security state display in accordance with the present embodiment. Similar to FIGS. 1A and 1B, as depicted in FIGS. 4A and 4B, the exemplary graphical port security state 400 includes a user 402, a plurality of switches A, B, C, and D (e.g., 406, 408, 410, and 412 respectively), all coupled to one another via the network 404. Although system 400 is shown and described as having certain numbers and types of elements, the present embodiment is not so limited; that is, system 400 may include elements other than those shown, and may include more than one of the elements that are shown.

In reference to FIGS. 4A and 4B, the present embodiment is described in the context of an example in which all the network devices of the exemplary network are switches. The present embodiment is further described in the context of an example in which the user 102 selects switch B 108 as the designated network device from which refresh of port security state information will be received. However, this example can be readily extended to other situations and embodiments. For example, the user 402 may select all the network devices depicted in FIGS. 4A and 4B (e.g., switches 406, 408, 410, and 412) from which an update of port security state information will be received. The user 102 may also select other network devices not depicted in FIGS. 4A and 4B from which port security state information will be received.

In reference now to FIG. 4A, in operation, in one embodiment, the user 402 sends a network device refresh signal 414 to a designated network device (e.g., switch B 408) via the network 404. The network device refresh signal 414 is sent to switch B because signal 414 is a signal requesting an update of switch B 408 port security state data. In the present embodiment, the network device refresh signal 414 is sent by the user 402 by a selection of the refresh button (e.g., refresh button 214 of FIG. 2) instead of inputting command lines. Referring back now to FIG. 4A, the network device refresh signal 414 may be sent by other methods, such as, but not limited to, the input of a symbol, the selection of a given character, a text command, and/or a voice command.

Referring now to FIG. 4B, also in operation, switch B 408 returns to the user 402 the new security state information signal 416 (also referred to as updated security state information signal) via the network 404. The security state information signal 416 is a signal containing updated data associated with the port security states of switch B 408. In this example, once the updated security state information signal 416 is received by the user 402, the updated information is converted by the present embodiment into a refreshed/updated interface containing multiple icons that convey at least a subset of the textual information contained in the updated information.

Figure 5:
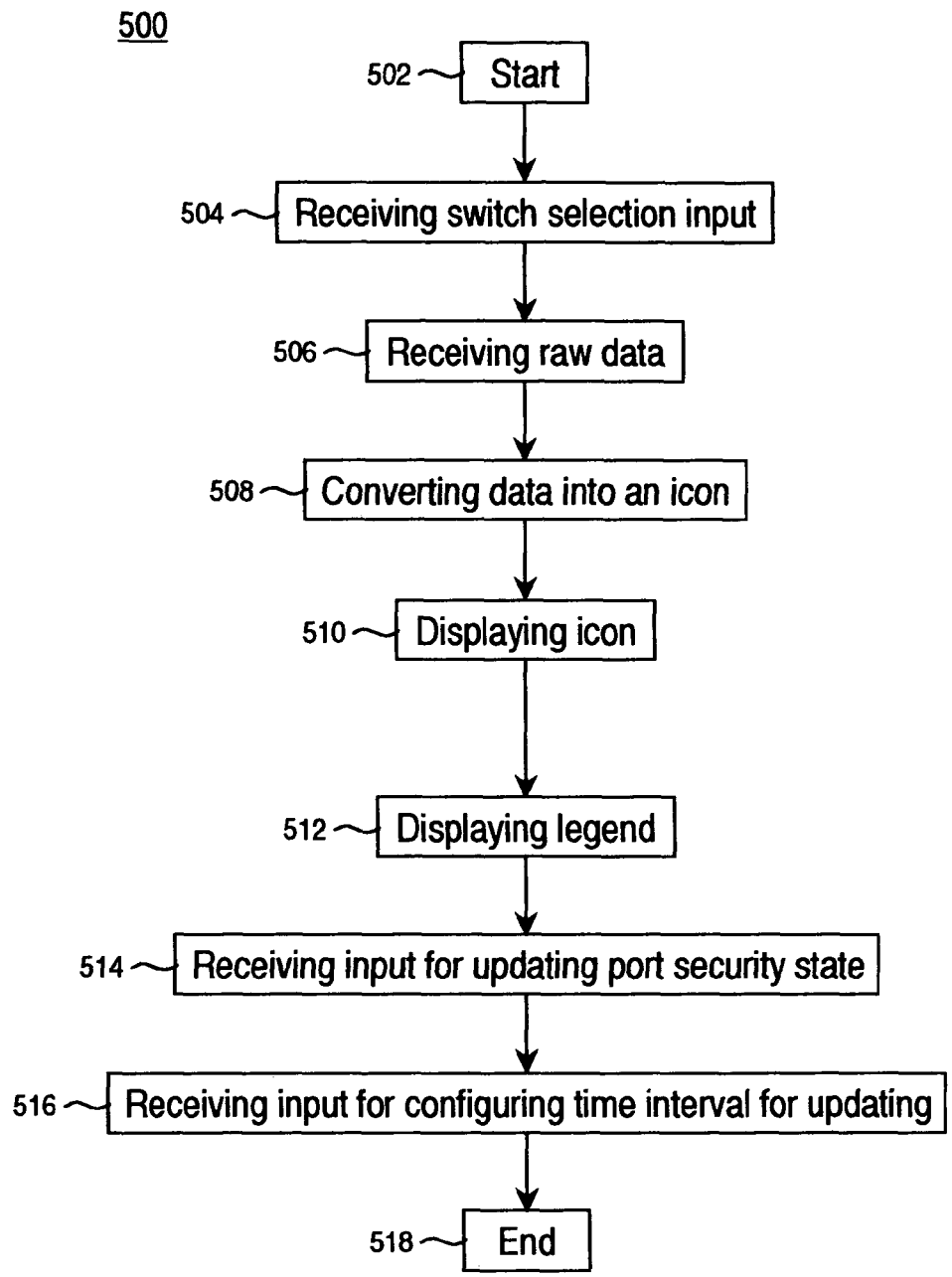
FIG. 5 illustrates an exemplary flowchart showing a method of graphically displaying port security states, according to an embodiment.

FIG. 5 illustrates a flowchart showing a method 500 of graphically displaying port security state, according to an embodiment. In one embodiment, method 500 is implemented by a processing device, such as a computer. Although specific steps are disclosed in flowchart 500, such steps are exemplary. That is, various embodiments are well suited to performing a variety of other additional steps or variations of the steps recited in flowchart 500. The steps in flowchart 500 may also be performed in an order different than presented. At block 502 of FIG. 5, the process starts.

At block 504 of FIG. 5, in one embodiment, a network device selection input from a user is received by a computer. A user can be an individual user, an individual user device, an enterprise, a service provider, or an application program. Also, there can be multiple numbers and/or types of users simultaneously. In one embodiment, a plurality of network device selection input requests is received. In another embodiment, the method 500 does not include receiving a selection input from a user; instead the present embodiment displays graphical representations of port security states of all the network devices of the network without selection by the user.

At block 506, in one embodiment, data associated with the port security state of a designated network device is received. As mentioned previously, data may include textual information such as, but not limited to, port access indicator status, port access MAC-based status, port access web-based status, port priorities, port access authenticator status, inbound rate limit maximum percentage, and quality of service.

At block 508, the data received is converted into one or more icon(s). An icon may take form in a variety of ways, or in a combination of ways such as, but not limited to, a symbol, a shape, a color, or a letter.

At block 510, the icon is displayed to a user. Icons may be displayed to one user, or a multiple number of users. In one embodiment, the icon is displayed along with other icons. In another embodiment, icons are displayed as part of a comprehensive report of the designated network device. The comprehensive report may be a table illustrated by icons, such as the Port Settings Table 211 of FIG. 2. In another embodiment, the comprehensive report, which includes the icon, also includes short text descriptions.

Referring back now to FIG. 5, at block 512, a legend containing the icon and its description is displayed to the user (e.g., Port Setting Indicator 311 of FIG. 3).

In reference now to FIG. 5, at block 514, input from the user for updating the port security state is received. This input, in some instances, is a selection of the refresh button (e.g., refresh button 214 of FIG. 2).

In reference to FIG. 5, at block 516, input from the user for configuring a time interval between automatic updating of the selected port security state is received. This input, in some instances, is the selection of the polling button (e.g., polling button 215 of FIG. 2). A user may also configure a time interval between automatic updates of the port security state display by another method, such as a voice command, or an input of a text character. Referring back now to FIG. 5, at block 518, the process ends.

Thus, by having a method of retrieving one or more port security state(s) with a selection of the designated network device(s), a user can receive port security status(es) and port authentication status(es), without having to input lengthy command lines. In addition, by receiving standardized output of port security status and port authentication through the graphical representation of port security state(s) (e.g., icons, including colors, symbols, and shapes) a user is able to obtain a concise real time view of the port security status and the port authentication status of one or more designated network devices. Furthermore, by utilizing an easily understood graphical scheme to represent a port security state of a network device (e.g., a switch), the need for a user to perform time consuming interpretations of outputs is reduced.

Figure 6:
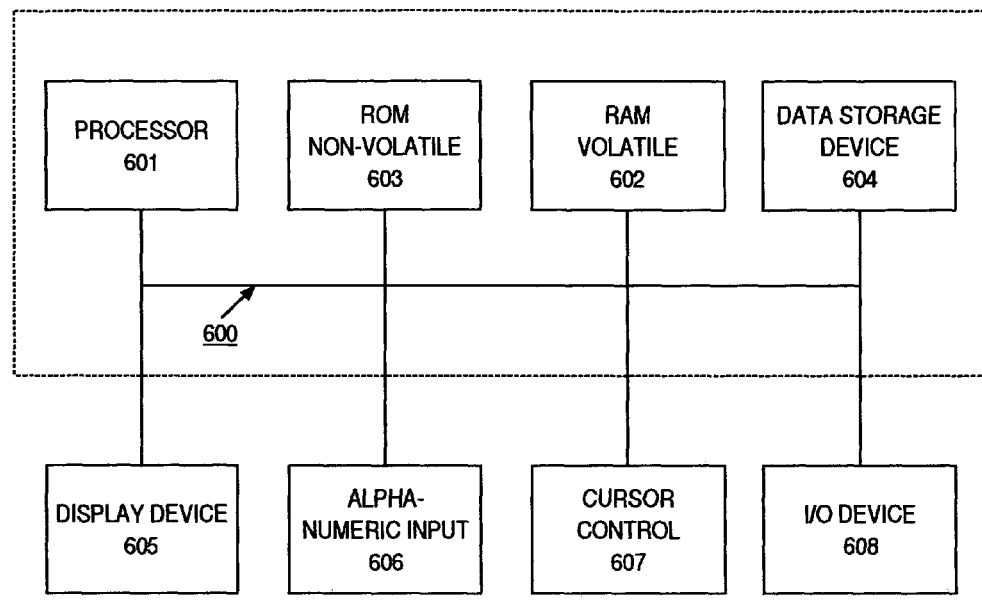
FIG. 6 illustrates an exemplary computer system in which graphical displays of port security states may be practiced, according to an embodiment.

FIG. 6 illustrates an exemplary computer system 690 upon which graphical displays of port security states may be practiced. In general, computer system 690 comprises bus 600 for communicating information (e.g., data associated with port security state(s)), processor 601 coupled with bus 600 for processing information and instructions, random access (volatile) memory (RAM) 602 coupled with bus 600 for storing information and instructions for processor 601, read-only (non-volatile) memory (ROM) 603 coupled with bus 600 for storing static information and instructions for processor 601, data storage device 604 such as a magnetic or optical disk and disk drive coupled with bus 600 for storing information and instructions, an optional user output device such as display device 605 coupled to bus 600 for displaying information, including the graphical displays of port security states to the computer user. In addition, computer system 690 also comprises an optional user input device such as alphanumeric input device 606 including alphanumeric and function keys coupled to bus 600 for communicating information and command selections (e.g., selection of designated network device(s)) to processor 601, and an optional user input device such as cursor control device 607 coupled to bus 600 for communicating user input information and command selections to processor 601. Furthermore, an optional input/output (I/O) device 108 is used to couple computer system 690 onto, for example, a network.

Display device 605, which may be used for graphical displays of port security states, is utilized with computer system 690. Display device 605 may be a liquid crystal device, cathode ray tube, or other display device suitable for creating graphic images and alphanumeric characters recognizable to the user. Cursor control device 607 allows the computer user to dynamically signal the two-dimensional movement of a visible symbol (pointer) on a display screen of display device 605. Many implementations of the cursor control device are known in the art including a trackball, mouse, joystick or special keys on alphanumeric input device 606 capable of signaling movement of a given direction or manner of displacement. It is to be appreciated that the cursor control 607 also may be directed and/or activated via input from the keyboard using special keys and key sequence commands. Alternatively, the cursor may be directed and/or activated via input from a number of specially adapted cursor directing devices.

In the foregoing specification, embodiments have been described with reference to numerous specific details that may vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for graphically displaying, on a first network device, a port security state of a second network device, said method comprising:
receiving, at the first network device, data associated with said port security state of said second network device, wherein said data comprises textual information indicating an authentication status and a security status of a port of the second network device;
converting, by the first network device, said textual information into icons corresponding to the authentication status and security status of the port of said second network device;
displaying the icons on the first network device;
periodically updating, by the first network device, the authentication status and the security status of the port of the second network device;
displaying updated icons on the first network device corresponding to the updated authentication status and the security status of the port of the second network device; and
receiving an input, by the first network device, to configure a time interval for updating the authentication status and the security status of the port of the second network device.

2. The method as recited in claim 1, further comprising receiving an input selecting said second network device.

3. The method as recited in claim 1, further comprising displaying a report for said second network device, wherein said report comprises said icons and a subset of information contained in said data.

4. The method as recited in claim 1, further comprising displaying a legend containing said icons.

5. The method as recited in claim 1, further comprising: displaying an icon corresponding to a quality of service associated with said second network device.

6. The method as recited in claim 1, further comprising: displaying an icon corresponding to a rate limit bandwidth associated with said second network device.

7. The method as recited in claim 1, wherein said icons are represented with a color to indicate said port security state of said second network device.

8. The method as recited in claim 1, wherein said icons are represented by a graphic shape to indicate said port security state of said second network device.

9. A non-transitory computer readable medium of a first network device storing instructions that when executed by a processor cause the processor to:
receive data associated with a port security state of a second network device, wherein the data comprises textual information indicating an authentication status and a security status of a port of the second network device;

convert the textual information into icons corresponding to the authentication status and security status of the port of the second network device;

display the icons on the first network device;

periodically update the authentication status and the security status of the port of the second network device;

display updated icons on the first network device corresponding to the updated authentication status and the security status of the port of the second network device; and receive an input to configure a time interval to update the authentication status and the security status of the port of the second network device.

10. The non-transitory computer readable medium of claim 9, wherein the instructions are further to cause the processor to: receive an input selecting the second network device.

11. The non-transitory computer readable medium of claim 9, wherein the instructions are further to cause the processor to: display a report of the second network device, wherein the report comprises the icons and a subset of information contained in the data.

12. The non-transitory computer readable medium of claim 9, wherein the instructions are further to cause the processor to: display an icon corresponding to a quality of service associated with the second network device.

13. The non-transitory computer readable medium of claim 9, wherein the instructions are further to cause the processor to: display an icon corresponding to a rate limit bandwidth associated with the second network device.

14. The non-transitory computer readable medium of claim 9, wherein one of the icons is represented by a graphic shape to indicate the port security state of the second network device.

15. A device comprising:
a processor; and
a non-transitory computer readable medium storing instructions that when executed by the processor cause the processor to:

receive data associated with a port security state of a second network device, wherein the data comprises textual information indicating an authentication status and a security status of a port of the second network device, convert the textual information into icons corresponding to the authentication status and security status of the port of the second network device, display the icons on the first network device, periodically update the authentication status and the security status of the port of the second network device, display updated icons corresponding to the updated authentication status and the security status of the port of the second network device, and receive an input to configure a time interval to update the authentication status and the security status of the port of the second network device.

16. The device of claim 15, wherein the instructions are further to cause the processor to: display an icon corresponding to a quality of service associated with the second network device.

17. The device of claim 15, wherein the instructions are further to cause the processor to: display an icon corresponding to a rate limit bandwidth associated with the second network device.

* * * * *